Patented Feb. 15, 1944

2,341,826

UNITED STATES PATENT OFFICE 2,341,826

COFFEE-CHICORY BLEND

Frank J. Stayton, Birmingham, Ala.

No Drawing. Application July 11, 1942,
Serial No. 450,517

9 Claims. (Cl. 99—72)

This invention relates to coffee and chicory mixtures such as are generally sold on the market, and has for an object to provide an addition to such a mixture which shall be capable of rendering a beverage made therefrom more palatable, more healthful, and more economical in use; also a beverage in which the color is greatly improved.

A further object of my invention is to provide a coffee-chicory mixture which shall be adapted to produce a beverage having an aroma and flavor comparable to that of the coffee costituent of the mixture taken alone, thereby resulting in an improved beverage at a greatly reduced price.

Mixtures of coffee and chicory are well known and widely used, such mixtures usually consisting of 70% coffee and 30% chicory. Roasted chicory is far more soluble than coffee and produces a darker colored beverage, but being devoid of the volatile flavors, gums and acids contained in coffee, it greatly alters the taste of a coffee beverage. While coffee-chicory mixtures are much more economical to use, and chicory is more readily digested than coffee, many persons object to the distinctive chicory taste in beverages made from such mixtures. Also, it is customary to make beverages from such mixtures stronger than ordinary coffee is made, thereby to obtain the benefit of a more coffee taste, but at the same time losing the economic benefit of the cheaper mixture.

It will be obvious, therefore, that a coffee-chicory mixture which will retain the distinctive coffee taste in whatever strength employed, is a distinct improvement over the prior art. Add to this the fact that less of the roasted mixture is required to make a palatable beverage and there results a marked economic improvement. Further, where the color of a beverage made from such a mixture is lighter and more nearly that of pure coffee, it is still more desirable.

I have discovered that an acid salt of calcium, particularly acid calcium phosphate, or other acid salt of the alkalies or alkali earth metals, permitted by the Pure Food and Drug laws, added to a coffee-chicory mixture in an amount from 0.25% to 1.0% of the weight of the mixture, produces a beverage which can not be distinguished from high grade, pure coffee, even by an expert. Also, with a mixture of 70% coffee and 30% chicory, only one-half as much of the mixture need be employed as is employed with pure coffee to make a comparable beverage. For example, where it is customary to use 0.4 oz. of pure coffee per cup, it will be found that 0.2 oz. of my improved mixture will produce a comparable beverage. The color of a beverage made from my improved mixture is also lighter and brighter than one made from coffee-chicory mixtures as heretofore known to me, so that my improved mixture produces a beverage which in color, aroma and flavor compares favorably with the finest coffee.

The salts which I have employed include the acid phosphates, acid pyrophosphates, acid sulphates, bitartrates, diacetates, dilactates, and mono basic alkali citrates. The acid radicals of these compounds are presumed to act upon the histidine bases in the chicory, developed during the roasting process, thus forming neutral or slightly acid histidine compounds and neutralizing the characteristic aromas and flavor of the chicory in a beverage made from the mixture and restoring the natural aroma and flavor of pure coffee. I can not explain why it requires less of my improved mixture than it does pure coffee to provide a comparable beverage, nor the reason for the improvement in color.

It may be found that some of the compounds mentioned above, in addition to destroying the flavor of chicory, impart to a coffee-chicory beverage a slightly "chemical," or other flavor noticeable to a sensitive taste, and thereby be less desirable to use than others. This may be found to be true particularly with the citrates, acetates, and acid pyrophosphates. In my experience, acid calcium phosphate is preferable in that the taste of the compounds formed by such acid salt more closely approaches the natural taste of coffee. Of course, any compound employed must comply with the Pure Food and Drug laws.

In making my improved mixture, I add sufficient of an acid salt of the character hereinbefore mentioned to provide a beverage having the flavor and aroma of a pure coffee beverage. The addition of from 0.25% to 1.0% of any of said acid salts will be found to be sufficient. By way of example, the mixture which I prefer is made in the following proportions:

Roasted coffee_____pounds__ 70
Roasted chicory_____do____ 30
Acid calcium phosphate_____ounces__ 7

The components are of course ground and thoroughly mixed.

While individual tastes will of course differ, a delightfully palatable beverage may be made from the above mixture by employing 0.2 oz. per cup of beverage or only one-half as much of the mixture as is necessary with pure coffee. Thus in making a beverage from my improved mixture only 35% as much coffee is employed as would be employed with pure coffee.

Chicory being relatively inexpensive, it will be seen that by means of my invention a high grade beverage, comparable to the finest coffee and including the finest coffee, may be made at a cost below that of low grade, inferior coffee, heretofore sold. At the same time, the consumption of caffeine is lowered and the physiological benefits of a part chicory beverage obtained.

I wish it to be understood that I do not desire to be limited to the exact details and proportions herein described, for obvious modifications will occur to a person skilled in the art. Only such limitations are to be imposed upon my invention as are specifically set forth in the appended claims.

What I claim is:

1. The method of improving a mixture of roasted coffee and chicory which consists in adding to such mixture from 0.25% to 1.0% of an acid salt of an alkaline earth metal.

2. The method of improving a mixture of roasted coffee and chicory which comprises adding to such mixture from 0.25% to 1.0% of an acid salt selected from the group consisting of the phosphates, pyrophosphates, sulphates, acetates, lactates, tartrates, and citrates of calcium, potassium and sodium.

3. The method of improving a mixture of roasted coffee and chicory in the proportions of approximately 70 parts coffee and 30 parts chicory which comprises adding from 0.25% to 1.0% of acid calcium phosphate thereto.

4. The method of improving a mixture of roasted coffee and chicory in the proportions of approximately 70 parts coffee and 30 parts chicory which comprises adding from 0.25% to 1.0% of acid calcium lactate thereto.

5. The method of improving a mixture of roasted coffee and chicory in the proportions of approximately 70 parts coffee and 30 parts chicory which comprises adding thereto from 0.25 to 1.0% of an acid calcium salt.

6. The method of improving a mixture of roasted coffee and chicory in the proportions of approximately 70 parts coffee and 30 parts chicory which comprises adding from 0.25% to 1.0% of acid sodium phosphate thereto.

7. A mixture of roasted coffee and chicory in the proportions of 70 parts coffee and 30 parts chicory and containing from 0.25% to 1.0% acid calcium phosphate.

8. A mixture of roasted coffee and chicory in the proportions of 10 parts coffee and 30 parts chicory and containing from 0.25% to 1.0% of an acid calcium salt.

9. A mixture of roasted coffee and chicory in the proportions of 70 parts coffee and 30 parts chicory and containing from 0.25% to 1.0% of an acid salt selected from the group consisting of phosphates, pyrophosphates, sulphates, acetates, lactates, tartrates, and citrates of calcium, potassium and sodium.

FRANK J. STAYTON.